United States Patent [19]

Iida

[11] Patent Number: 4,690,203

[45] Date of Patent: Sep. 1, 1987

[54] AUTOMOTIVE AIR-CONDITIONING SYSTEM ADAPTED TO OBVIATE THE INFLUENCE OF INSOLATION DURING BLOWER START-UP

[75] Inventor: Katsumi Iida, Saitama, Japan

[73] Assignee: Diesel Kiki Kabushiki Kaisha, Tokyo, Japan

[21] Appl. No.: 833,647

[22] Filed: Feb. 25, 1986

[30] Foreign Application Priority Data

Mar. 18, 1985 [JP] Japan ............................... 60-053981

[51] Int. Cl.$^4$ ............................................. F25B 29/00
[52] U.S. Cl. ......................................... 165/25; 165/42; 236/49; 237/12.3 B
[58] Field of Search ...................... 236/38, 49; 165/25, 165/42, 43; 237/12.3 A, 12.3 B

[56] References Cited

U.S. PATENT DOCUMENTS

| 4,262,738 | 4/1981 | Kato et al. | 165/25 |
| 4,417,618 | 11/1983 | Yoshimi et al. | 236/49 X |
| 4,498,309 | 2/1985 | Kobayashi | 236/49 X |
| 4,518,032 | 5/1985 | Funasaki et al. | 236/49 X |
| 4,523,715 | 6/1985 | Ohsawa et al. | 236/49 |
| 4,531,671 | 7/1985 | Schwenk | 237/12.3 B |
| 4,537,245 | 8/1985 | Nishimura et al. | 236/49 X |
| 4,602,675 | 7/1986 | Kobayashi | 236/49 X |

Primary Examiner—William R. Cline
Assistant Examiner—Randolph A. Smith
Attorney, Agent, or Firm—Flynn, Thiel, Boutell & Tanis

[57] ABSTRACT

An automotive air-conditioning system includes an arithmetic unit which provides combined control signals at least on the basis of data representing room temperature, fresh air temperature, set temperature and intensity of insolation; a blower control unit which controls the blowing rate of a blower according to the combined signals; an air mixing control unit which controls the opening of an air mixing door on the basis of the combined signals; a mode changing unit which establishes the defrosting mode, the face mode, the foot mode or the bilevel mode according to a mode changing signal based on the opening of the air mixing door and the temperature of an evaporator; a blowing rate control unit which increases the actual blowing rate of the blower gradually after the actuation of the blower; and a control unit which controls the air mixing door control unit and the mode changing unit on the basis of the temperature of the engine cooling water. The foot mode where conditioned air is blown through the foot opening is established while the blowing rate of the blower is being increased to a blowing rate corresponding to the combined signals after the actuation of the blower, and movement of the air mixing door beyond a predetermined position toward a position for a cooling mode is inhibited when the temperature of the engine cooling water is on the high level, so that agreeable air-conditioning is achieved without being affected adversely by the intensity of insolation.

2 Claims, 3 Drawing Figures

AUTOMOTIVE AIR-CONDITIONING SYSTEM ADAPTED TO OBVIATE THE INFLUENCE OF INSOLATION DURING BLOWER START-UP

BACKGROUND OF THE INVENTION

1. Field of the invention

The present invention relates to an automotive air-conditioning system and, more specifically, to an automotive air-conditioning system capable of obviating the adverse influence of insolation on air-conditioning control during a period from the start of the blower to a time when the blowing rate of the blower reaches the normal level so that agreeable air-conditioning is achieved.

2. Description of the Prior Art

A conventional automotive air-conditioning system is illustrated in FIG. 3. As shown in FIG. 3, a duct 1 is provided with a selector door 2 for selectively establishing the fresh air intake mode or the room air recirculating mode, a blower 3, an evaporator 4, an air mixing door 5, a heater core 6, mode changing doors 7, a window defrosting opening 8, a center opening 9 and a foot opening 10. The heat exchanger 4, a compressor 11, a condenser 12, a receiver tank 13 and an expansion valve 14 constitute a cooling system. The compressor 11 is connected through a magnetic clutch 16 to the engine 15. An AD converter 17 receives analog signals representing room temperature Tr detected by a room temperature sensor 18, an opening $\theta$ of the air mixing door detected by a potentiometer 19, intensity of insolation Ts detected by an insolation sensor 20, fresh air temperature Ta detected by a fresh air temperature sensor 21, evaporator temperature Tm detected by a temperature sensor 22 and set temperature Td provided by a temperature setting unit 23, and gives the corresponding digital signals to a control unit 24.

The control unit 24 is a computerized control unit comprising a selector door control means 27 for controlling the selector door 2 through a changeover circuit 25 and an actuator 26, a compressor control means 29 for controlling the magnetic cluth 16 through a driving circuit 28, a blower control means 31 for controlling the blower 3 through a driving circuit 30, an air mixing door control means 34 and an actuator 33, a mode changing door control means 37 for controlling the mode changing doors 7 through a changeover circuit 35 and an actuator 36, and a central data processing means 38 which processes the data corresponding to room temperature Tr, intensity of insolation Ts, fresh air temperature Ta, evaporator temperature Tm and set temperature Td, and which gives blows signals T to the control means 27, 29, 31, 34 and 37. Indicated at 39 is a manual switch.

The blower 3 is controlled by the blower control means 31 on the basis of the combined signals T so that the blower blowes air at a blowing rate corresponding to the combined signals T. The air mixing door 5 is controlled by the air mixing door control means 34 so that the opening $\theta$ of the air mixing door 5 corresponds to the combined signals T. The mode changing door 7, the changeover circuit 35, the actuator 36 and the mode changing door control means 37 constitute a mode changing means 40. The mode changing means 40 controls the mode changing doors 7 on the basis of a mode changing signal TOF represented by Expression (1) to establish a defrosting mode where conditioned air is blown through the window defrosting opening 8, a face mode where conditioned air is blow through the center opening 9, a foot mode where conditioned air is blow through the foot opening 10 or a bilevel mode where conditioned air is blown through both the center opening 9 and the foot opening 10.

$$TOF = Tm + K\theta + \beta \tag{1}$$

where K and $\beta$ are constants.

This conventional automotive air-conditioning system functions in the following manner.

When an air-conditioner switch and a fan switch are operated, the blower 3 is started and a predetermined air-conditioning control program is executed on the basis of the combined signals T and the mode changing signal TOF. During the initial stage of air-conditioning immediately after the operation of the air-conditioning switch and the fan switch, namely, immediately after the start of the blower 3, the blowing rate of the blower 3 is increased gradually for agreeable air-conditioning in the heating mode. Therefore, the actual blowing rate of the blower 3 does not rise immediately to a blowing rate corresponding to the combined signal T and reaches the blowing rate corresponding to the combined signals T with a time lag. During this initial stage where the actual blowing rate does not coincide with the blowing rate corresponding to the combined signals T, the following problems arise.

Suppose that insolation Ts is high when fresh air temperature Ta is low and heating is required accordingly. Then, the combined signals T is affected greatly by insolation Ts, and thereby the air mixing door 5 is turned to a position corresponding to the full cooling mode. The variation of the opening of the air mixing door 5 causes the mode changing door control means 37 to control the mode changing doors 7 according to TOF determined by Exp. (1) to establish the face mode. Consequently, warm air is not blown through the foot opening 10, while the fresh air temperature Ta is low and hence heating is necessary, which does not meet conditions for agreeable air-conditioning.

A device relating to an automotive air-conditioning system is disclosed in U.S. Pat. No. 4,262,738 and Japanese Utility Model Publication No. 54-37104, however, this device is unable to solve the above-mentioned problem.

SUMMARY OF THE INVENTION

Accordingly, it is an object of the present invention to provide an automotive air-conditioning system capable of obviating the adverse influence of insolation on air-conditioning control during a period from the start of the blower to a time when the blowing rate of the blower reaches the normal level so that agreeable air-conditioning is achieved.

The object of the invention is achieved by an automotive air-conditioning system comprising: a combined signal producing means which calculates combined signals T at least on the basis of room temperature Tr, fresh air temperature Ta, set temperature Td and intensity of insolation Ts; a blower control means which controls a blower so that conditioned air is blown at a blowing rate corresponding to the combined signals t; an air mixing door control means which controls the opening $\theta$ of an air mixing door according to the combined signals T; a mode changing means which, according to a mode changing signal based on the opening $\theta$ of the air mixing door and the evaporator temperature Tm, establishes a defrosting mode where conditioned air is blown through a window defrosting opening, a face mode where conditioned air is blown through a foot opening or a bilevel mode where conditioned air is blown through both the center opening and the foot opening; a blowing rate control means which increases the blowing rate of the blower gradually after the blower has been started: an arithmetic means which calculates the difference between a normal blow rate corresponding to the combined signals T and the blowing rate during the initial stage of air-conditioning operation immediately after the start of the blower, and provides a detection signal when the difference is reduced below a predetermined value; a sensor for detecting the temperature of the engine cooling water: and a control means which operates from a time when the blower is actuated to a time when the detection signal is provided by the artihmetic means, controls the air mixing door control means and the mode changing means on the basis of the output signal of the sensor for detecting the temperature of the engine cooling water, and comprises a first mode setting means which establishes a first mode where conditioned air is blown through the window defrosting opening and the foot opening while the temperature of the enging cooling water is high, and restricts the control of the air mixing door beyond a position corresponding to a predetermined opening toward a position corresponding to the cooling mode.

The above and other objects, features and advantages of the present invention will become more apparent from the following description of the preferred embodiment thereof taken in conjunction with the accompanying drawings.

DESCRIPTION OF THE PREFERRED EMBODIMENT

Figure 1:
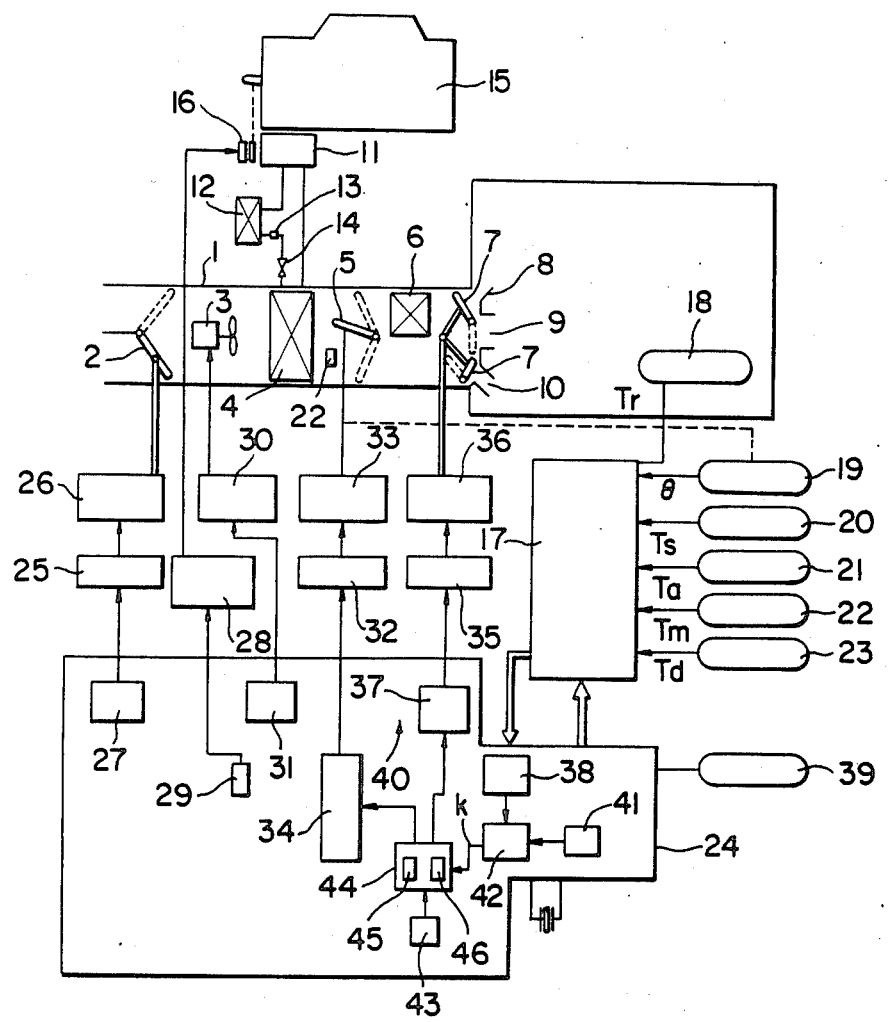
FIG. 1 is a block diagram showing the general constitution of an automotive air-conditioning system according to the present invention.
Figure 2:
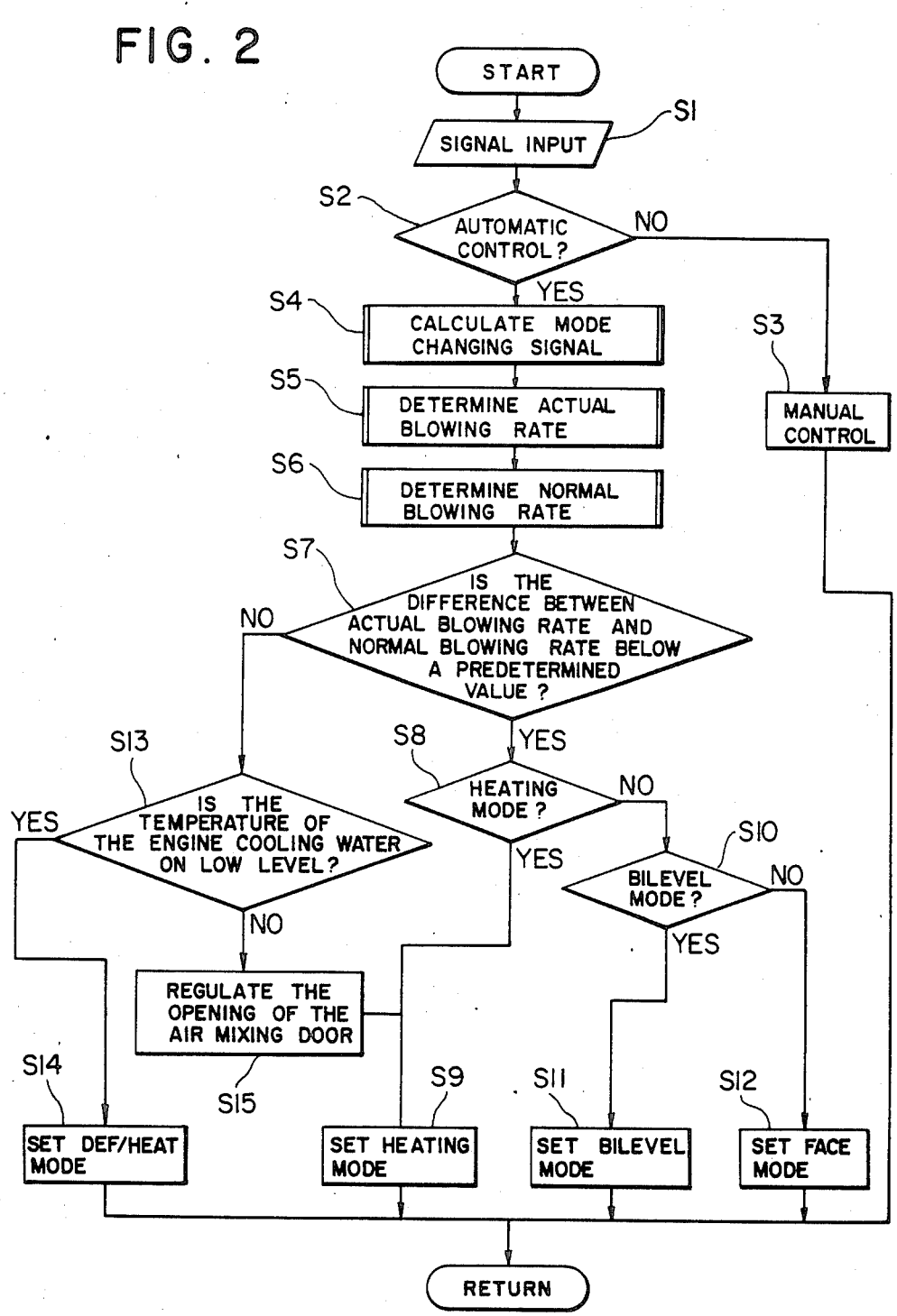
FIG. 2 is a flow chart of a control program for controlling the operation of the automotive air-conditioning system of FIG. 1.
Figure 3:
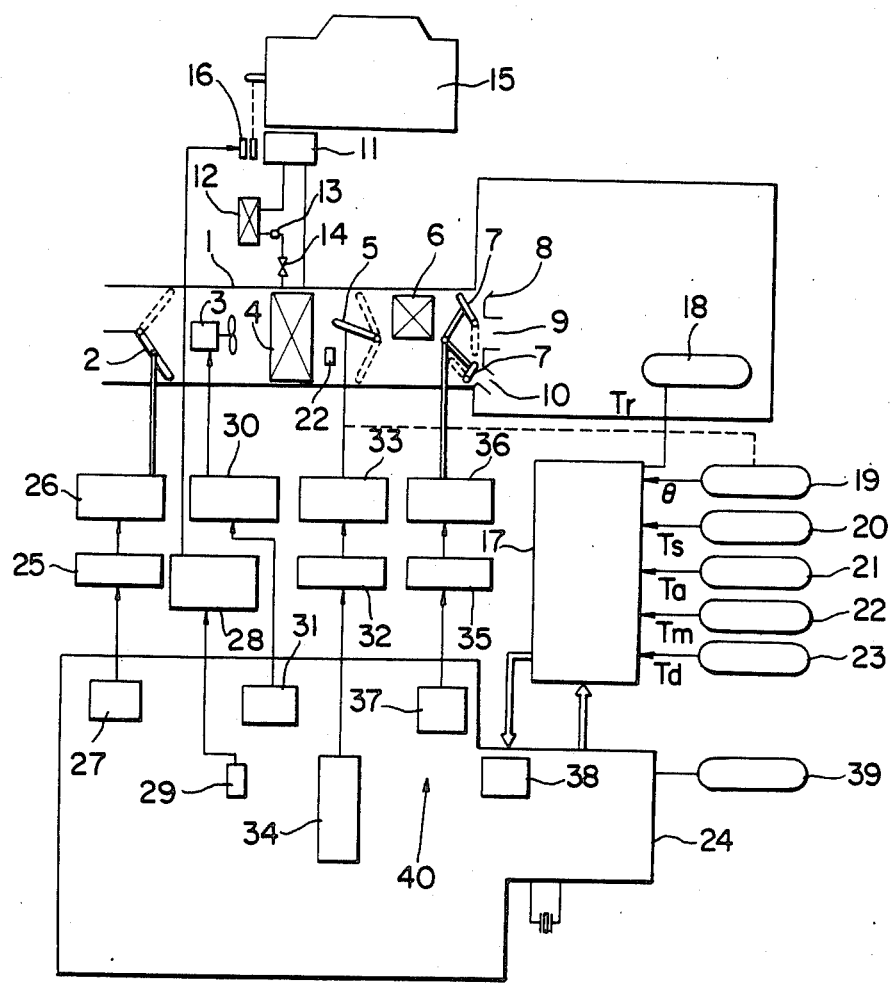
FIG. 3 is a block diagram showing the general consititution of a conventional automotive air-conditioning system.

In FIGS. 1 to 3, like reference characters designate like or corresponding parts through out. In the following description of a preferred embodiment of the present invention, the description of those components which are the same in constitution and function as those of the above-mentioned conventional automotive air-conditioning system will be omitted for simplicity.

In FIG. 1, indicated at 41 is a blowing rate control means which controls a blower 3 so that the blowing rate is increased gradually after the actuation of the blower 3; at 42 is an arithmetic means which provides a detection signal K when the different between a normal blowing rate corresponding to the combined signals T and the actual blowing rate is reduced below a predetermined value and also compares the difference between the normal blowing rate and the actual blowing rate in the voltages thereof; at 43 is a temperature switch which serves as a sensor for detecting the temperature of the enging cooling water; and at 44 is a control means which controls an air mixing door control means 34 and a mode changing means 40 on the basis of the output signal of the temperature switch 43 during a period from a time when the blower is actuated to a time when the detection signal K is provided. The control means 44 comprises a first mode setting means 45 which establishes a first mode where conditioned air is blown through the window defrosting opening 8 and the foot opening 10 while the temperature of the enging cooling water is on the low level, and a second mode setting means 46 which establishes a second mode where conditioned air is blow through the foot opening 10 and the control of air mixing door 5 is restricted to a position beyond a predetermined opening toward a position corresponding to the cooling mode and comprising the members such as a limiter which does not apply a voltage when a range of opening of the air mixing door 5 is in a predetermined opening based on an output from the potentiometer which detects the range of opening of the air mixing door 5.

The manner of operation of the automotive air-conditioning system thus constituted according to the present invention will be described hereinafter with reference to FIG. 2.

At Step S1, detection signals such as the opening $\theta$ of the air mixing door 5 and the temperature Tm of the heat exchanger 4 are given to the control unit 24. At Step S2, a decision is made as to whether the control mode is an automatic control mode or a manual control mode. When the manual control mode is selected, the manual control mode is established at Step S3. On the other hand, when the automatic control mode is selected, a mode changing signal TOF is calculated on the basis of those input signals at Step S4. At Step S5, the blowing rate control means 41 increases the blowing rate of the blower 3 so that the flow rate of air in the duct 1 is increased. At Step S6, a blowing rate corresponding to the combined signals T is decided, and then at step S7, the calculated blowing rate corresponding to the combined signal T is compared with the actual blowing rate at the actuation of the blower 3.

When the difference between the blowing rate corresponding to the combined signals T and the actual blowing rate is reduced below a predetermined value or when the difference is reduced to zero, the normal air-conditioning control is executed in the known procedures.

In the air-conditioning control, first, decision is made on the basis of the mode changing signal TOF at Step S8 as to whether or not the heating mode needs to be established and, when YES, the heating mode is established at Step S9; when NO, decision is made at Step S10 as to whether or not the bilevel mode needs to be established. When decision is made that the bilevel mode needs to be established, the bilevel mode is established at Step S11 and when the decision at Step S10 is NO, the cooling mode is established at Step S12.

On the other hand, when decision is made at Step S7 that the difference between the normal blowing rate, namely, a blowing rate corresponding to the combined signals T, and the actual blowing rate immediately after the actuation of the blower 3 is greater than the predetermined value, decision is made at Step S13 on the basis of the output signal of the temperature switch 43 as to whether the temperature of the enging cooling water is on the high level or on the low level. When the temperature of the engine cooling water is on the low level, the first mode setting means 45 establishes the first mode, namely, a DEF/HEAT mode in which air is blown through both the window defrosting opening 9 and the foot opening 10, at Step S14. When the temperature of the engine cooling water is on the high level, the second mode setting means 46 restricts the air mixing door control means 34 changing the position of the air mixing door 5 to a position in a range for the cooling mode beyond a predetermined opening at Step S15, and then establishes the heating mode at Step S9.

Thus, while the actual blowing rate of the blower 3 immediately after the actuation of the blower 3 is lower than a blowing rate corresponding to the combined signals T, warm air is blown through the foot opening 10 when the fresh air temperature Ta is low and the intensity of insolation Ts is high, to achieve agreeable air-conditioning operation.

As apparent from the foregoing description, according to the present invention, during the initial stage of the air-conditioning operation immediately after the actuation of the blower, in which the blowing rate of the blower is increased gradually until the actual blowing rate coincides with a blowing rate corresponding to the combined signals T representing the ambient conditions, warm air is blow through the foot opening when the temperature of the engine cooling water is on the high level and the movement of the air mixing door beyond a predetermined opening toward a position for the cooling mode is inhibited; consequently, agreeable air-conditioning is achieved without being adversely affected by the intensity of insolation.

Although the invention has been described in its preferred form with a certain degree of particularity, it is to be understood that many changes and variations are possible in the invention without departing from the scope and spirit thereof.

What is claimed is:

1. An automotive air-conditioning system comprising:
   (a) a combined signal producing means which calculates combined signals T at least on the basis of room temperature, fresh air temperature, set temperature and intensity of insolation; a blower control means which controls a blower so that conditioned air is blown at a normal blowing rate corresponding to the combined signals T;
   (b) an air mixing door control means which controls the opening of an air mixing door according to the combined signals T;
   (c) a mode changing means which, according to a mode changing signal based on the opening of the air mixing door and on the temperature of an evaporator, establishes one of a defrosting mode where conditioned air is blown through a window defrosting opening, a face mode where conditioned air is blown through a center opening, a foot mode where conditioned air is blown through a foot opening, and a bilevel mode where conditioned air is blown through both the center opening and the foot opening;
   (d) a blowing rate control means which increases the blowing rate of the blower gradually after the blower has been started;
   (e) an arithmetic means which calculates the difference between the normal blowing rate corresponding to the combined signals T and the blowing rate during the initial stage of air-conditioning operation immediately after the start of the blower, and which provides a detection signal when the difference is reduced below a predetermined value;
   (f) a sensor for detecting the temperature of the engine cooling water and for producing an output signal representative of the temperature of the cooling water; and
   (g) a control means which operates from a time when the blower is actuated to a time when the detection signal is provided by the arithmetic means, and when operating controls the air mixing door control means and the mode changing means on the basis of the output signal of the sensor for detecting the temperature of the engine cooling water.

2. An automotive air-conditioning system according to claim 1, wherein the control means includes first mode setting means which establishes a first mode where conditioned air is blow through the window defrosting opening and the foot opening while the temperature of the engine cooling water is on the low level, and includes second mode setting means which establishes a second mode where conditioned air is blown through the foot opening while the temperature of the engine cooling water is on the high level and where movement of the air mixing door beyond a position corresponding to a predetermined opening in a direction toward a position corresponding to the cooling mode is inhibited.

* * * * *